United States Patent [19]

Lucas et al.

[11] 4,432,342
[45] Feb. 21, 1984

[54] INFLATABLE SOLAR COLLECTOR

[75] Inventors: Jean Lucas, Antony; Lancine Sylla, Korotoumou, both of France

[73] Assignee: Centre National D'Etudes et D'Experimentation de Machinisme Agricole, Antony, France

[21] Appl. No.: 212,191

[22] Filed: Dec. 1, 1980

[30] Foreign Application Priority Data

Nov. 30, 1979 [FR] France ............................ 79 29576

[51] Int. Cl.³ .............................................. F24J 3/02
[52] U.S. Cl. .................................. 126/418; 126/424; 126/426; 126/438; 350/295
[58] Field of Search .............. 126/418, 424, 425, 426, 126/438, 451; 350/293, 295, 299, 310

[56] References Cited

U.S. PATENT DOCUMENTS

| | | | |
|---|---|---|---|
| 3,054,328 | 9/1962 | Rodgers | 126/438 X |
| 3,182,654 | 5/1965 | Culling | 126/424 |
| 3,326,624 | 6/1967 | Maydell et al. | 126/426 X |
| 3,552,835 | 1/1971 | Benzies | 350/310 X |
| 4,033,676 | 7/1977 | Brantley et al. | 126/425 X |
| 4,038,971 | 8/1977 | Bezborodko | 126/438 |
| 4,051,834 | 10/1977 | Fletcher et al. | 126/426 X |
| 4,131,111 | 12/1978 | Hopper | 126/450 |
| 4,166,446 | 9/1979 | Youngs | 126/438 |
| 4,271,822 | 6/1981 | Radebold | 126/426 |

FOREIGN PATENT DOCUMENTS

| | | |
|---|---|---|
| 876401 | 11/1979 | Belgium . |
| 6844 | 1/1980 | European Pat. Off. . |
| 2840019 | 3/1980 | Fed. Rep. of Germany . |
| 2362347 | 3/1978 | France . |

Primary Examiner—Samuel Scott
Assistant Examiner—Margaret A. Focarino
Attorney, Agent, or Firm—Young & Thompson

[57] ABSTRACT

A solar collector comprises an upper transparent flexible cover and a lower reflectively metallized sheet, the upper cover and the lower sheet both being flexible and the space between them being inflated under gas pressure. The joint between the upper and lower members is closed by longitudinal stringers that are carried by upright side walls that protect the lower sheet against deformation by the force of the wind. Tubes carrying the liquid to be heated are disposed within the inflated enclosure, the sun's rays being concentrated on them by the reflective coating on the lower sheet; and these tubes are appropriately moved so as to follow the focal point of the lower reflector as the reflector and the sun move relative to each other during the day.

7 Claims, 6 Drawing Figures

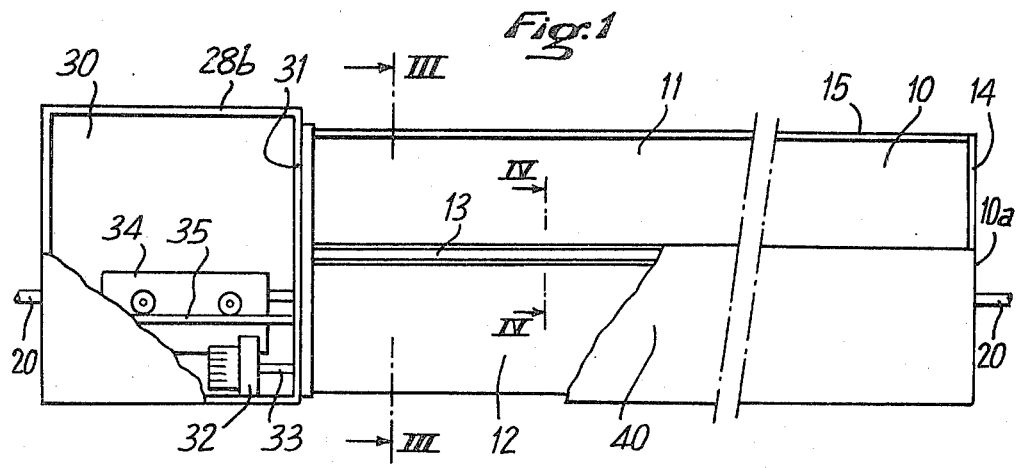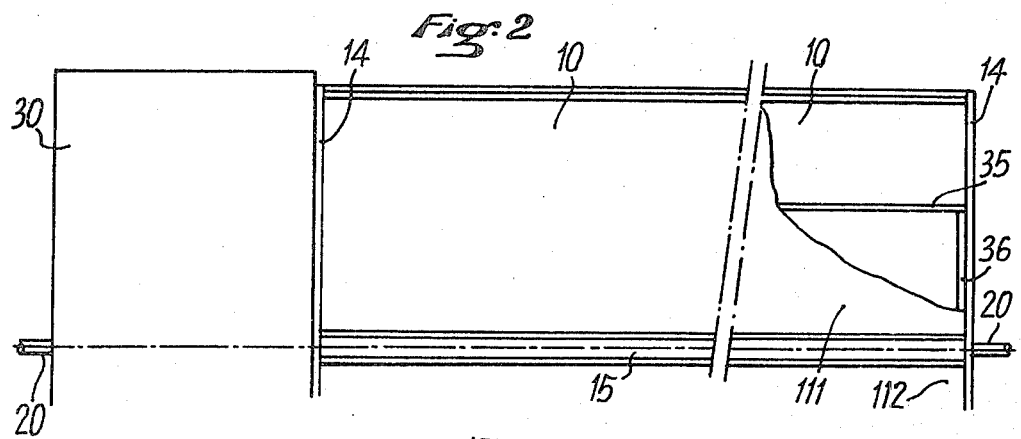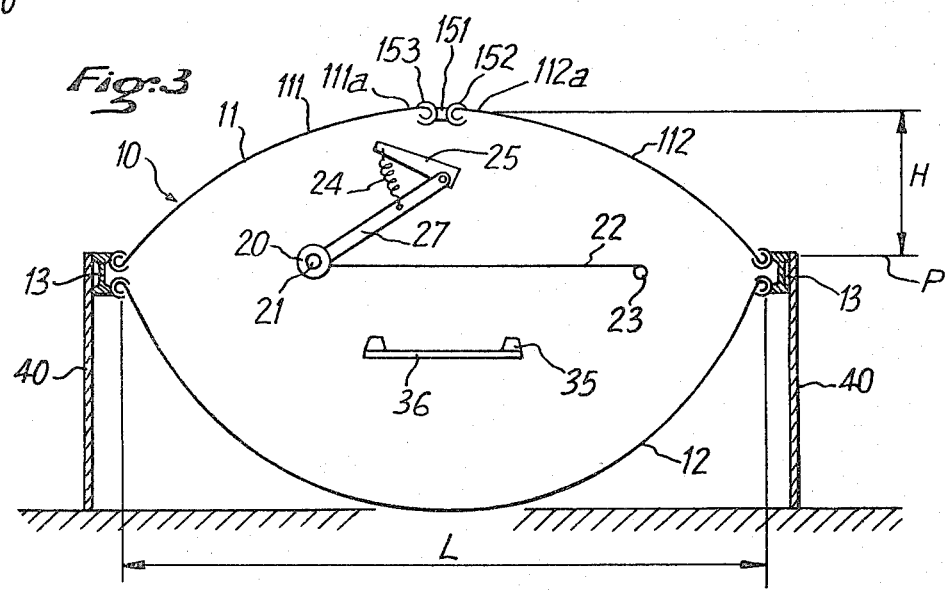

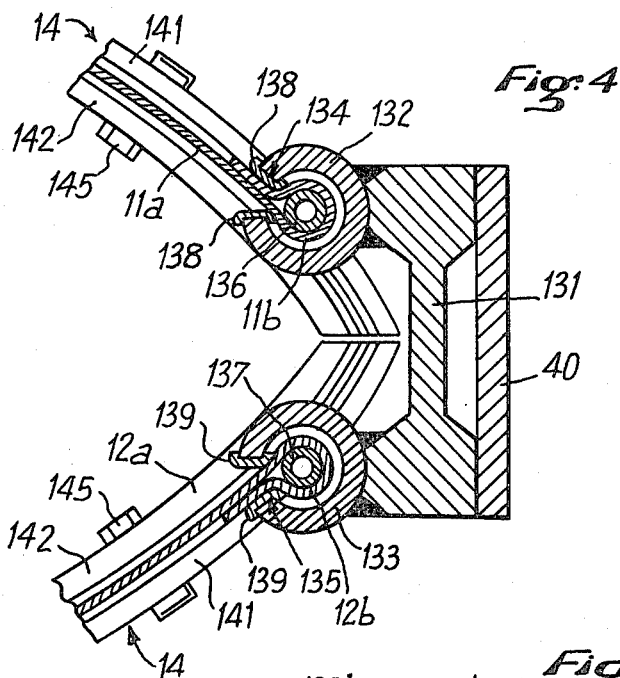
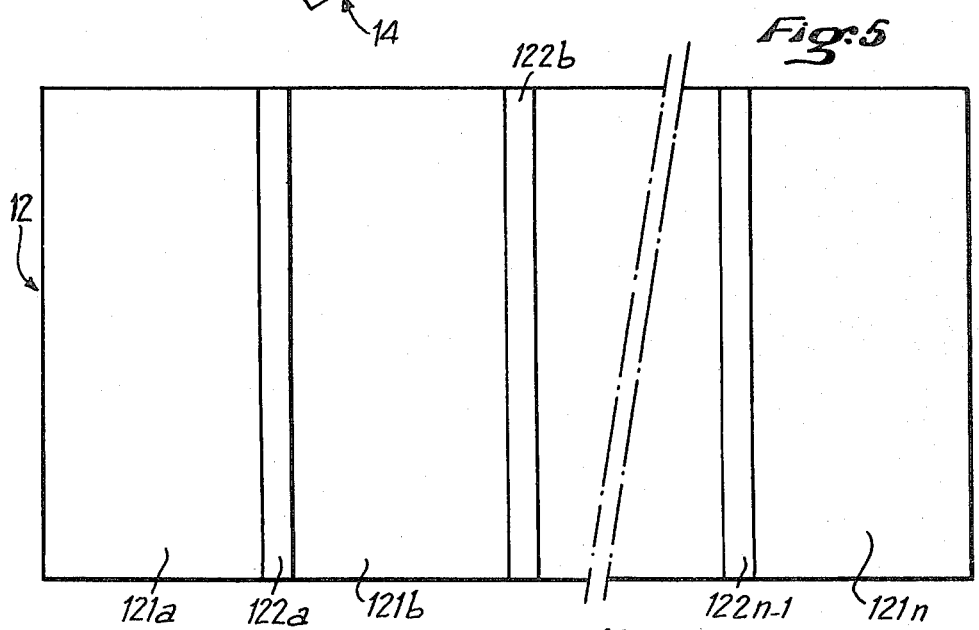
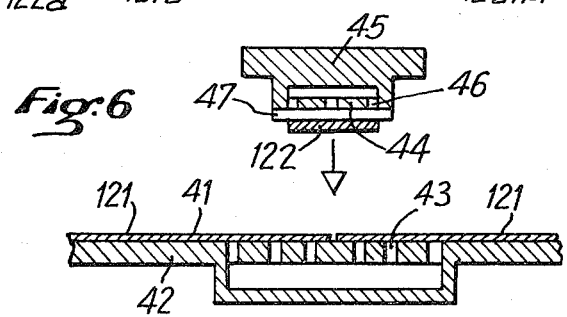

INFLATABLE SOLAR COLLECTOR

It has already been proposed, for example in French Patent No. 1,319,144 of Oct. 5, 1962, to collect solar energy with a device comprising a collector or receiver capable of absorbing incident solar radiation and converting it to heat or electrical energy, this collector or receiver being disposed in the focal region of a concave reflector. It is also known from this patent to impart to the reflector a cylindrical form with a circular directrix and to dispose the oblong receiver, in the form of one or more tubes parallel to the axis, in the focal zone of the receiver.

So as to provide a device which will be light in weight and easy to transport, the above-identified French patent proposes that the cylindrical reflector be a reflective layer applied to a portion of the wall of an inflatable envelope.

It is recited in this patent that it is necessary to change the inclination of the mirror, particularly by rotation of the cylindrical envelope about its axis, to follow the seasonal variations of the zenith or to provide complex means whereby the reflector will follow said variation of the zenith and the diurnal variation of the declination of the sun or complex receiver of sufficient extent that the sun's rays fall on the receiver during all the length of the day. This patent had for its main object to avoid heliostatic mounting of the parabolic mirrors and to utilize efficiently the focussed rays of a cylindrical mirror constituted by a portion of the wall of an inflatable envelope. It should also be noted that the embodiment of the collector disclosed in this patent required a very strong mechanical structure to support the inflatable envelope at its ends and that the only means provided to avoid deformation from the precise cylindrical shape are extremely rigid walls and reinforcements of the wall comprised by annular external and/or internal ribs.

French Patent No. 2,362,347 of Aug. 19, 1976 relates to a solar collector of the same type and teaches only, relative to the above-identified patent, that the inflatable enclosure may have a biconvex form. This patent on the other hand does not disclose any means to follow the seasonal variation of the zenith or the variation of the declination but indicates only the presence of a support fixed to mountings anchored in the ground, the support being, in the drawings, always shown inclined so that the solar rays will be parallel to the axial plane of the mirror. No means is described to protect the inflatable enclosure from deformation under the force of the wind.

French Patent No. 2,261,489 also discloses a solar collector with a cylindrical mirror which may be an inflatable structure with, at the focus of said mirror, an energy collector. In this patent the enclosure is cylindrical and, in a first embodiment, the collector is maintained in the focal zone by rotation about the axis of the cylinder under the control of a known control device such that, according to a second embodiment and as in French Patent No. 1,319,144, the cylindrical mirror is caused to rotate in a controlled manner relative to the ground so as to follow the declination of the sun. This patent does not deal with the problem of resistance to deformation of the inflatable structure particularly under the force of the wind.

The principal interest in an inflatable solar collector according to the techniques set forth above is the low cost of the film used as the mirror. Nevertheless, these techniques lose all interest if the embodiment of these films is effected by means of portable structures whose cost is quite high. In view of this state of the art, the invention therefore has for its object to provide a solar collector of lightweight and inexpensive construction in which the form of the reflector comprised by a film with a reflective surface, will not be distorted by the force of the wind, which problem is raised but not completely solved by French Patent No. 1,319,144 described above. In a collector with a cylindrical mirror, of greatest importance is in fact to avoid deformation of the reflective film under the force of the wind. This is solved, in collectors of known type until now in which it is desired to use a mirror of the thin sheet kind, by increasing the inflation pressure or surface pressure applied to the film forming the mirror or by decreasing the radius of curvature, the first method serving to increase the forces and as a result the weight of the material per square meter, the second serving to increase the mechanical strength of the structure, for the same intercepted radiation.

The invention is based on a separation of the reflective portion of the means performing the mirror function and the means avoiding deformation of the mirror under the effect of the wind. This object is achieved according to the invention with a solar collector of the mirror type which is shaped by gaseous pressure on its surface comprising a rigid frame defining at least two longitudinal edges with at least one sheet fixed by its edges on the longitudinal edges of the frame, the surface of this sheet being reflective, with a transparent element impervious to the gaseous pressure forming the mirror enclosing the space, characterized in that the frame is fixed and in that the space surrounding the outer surface of the reflective deformable sheet is isolated from the exterior by a housing which is rigid against the forces of the wind.

By virtue of the fact that the housing which is undeformable under the forces of the wind is separated from the reflective surface, it can be provided in an inexpensive way for example by walls rising from the subjacent surface to the edges of the frame of the solar collector or to the peripheral edges of the ensemble of the frames of a grouped assembly of solar collectors. These walls may moreover have thermal insulation properties to reduce the heat losses from the external surface of the reflector.

According to another characteristic and to reduce the deformation under the effect of wind of the transparent element when the latter is provided by a flexible sheet shaped by the gaseous pressure, the width of this flexible transparent sheet is less than 125% of the spacing between the lateral edges of the frame. This characteristic ensures the advantage of an inflated volume exposed to the wind of reduced height relative to the inflatable cylindrical enclosures of the prior art. In fact the width of this sheet is made as small as possible, and thus the radius of curvature in the inflated condition as large as possible, having regard to the mechanical strength of the sheet and to the internal pressure which may also be reduced by virtue of the principal characteristic of the invention.

The wind forces, particularly of side winds, create a pressure on one of the sloping sides and a suction on the other sloping side of the transparent element. It is therefore essential, when this element is constituted by a flexible sheet, to avoid air movements engendered by deformation of the latter which could deform the flexible mirror particularly under the additive effect of the pressure and suction described above. To avoid this additive effect and according to another characteristic, at least one longitudinal reinforcement, rigid at least transversely, is mechanically associated with the transparent sheet. According to this embodiment, the movements of the upper part of the envelope resulting from the pressure of the wind on the surfaces exposed thereto are substantially cancelled. The internal pressure may therefore be reduced, which permits using a weaker sheet which accordingly is thinner.

Because the position of the reflective portion is fixed and the mirror surface is used but partially as a function of the height of the sun, it is desirable to be able to capture the solar radiation over the greatest possible zenith angle (angles on opposite sides of the zenith). As a result and according to another characteristic of the invention, the width of the flexible sheet comprising the mirror is equal to about 130% of the distance between the lateral edges of the frame.

The provision of an inflatable enclosure according to the invention raises a two-fold problem of securing the edges of the sheets to the elements of the frame and to the reinforcing elements of the upper sheet and of providing thin sheets of great width from commercially available films.

As to the securement of the edges of the sheets and having regard for the reduced fluidtightness required by virtue of the low internal pressure of the enclosure they delimit, one uses preferably and according to the invention rigid mechanical elements having at least one tubular throat that opens through a slot along its length, the folded edge of each flexible sheet adjacent this element being introduced through the slot into the corresponding tubular throat with an element of thickness greater than the width of the slot introduced into the fold within the throat.

The element of greater thickness than the width of the slot may be a stick or a rod threaded longitudinally in the fold or a tubular element introduced deflated between the two surfaces of the sheet through the slot and inflated in place by a suitable fluid. The two surfaces of the folded edge are preferably secured together to form a tubular edge.

According to a modified construction, the tubular throat is provided by an element in the form of an open throat fixed to the corresponding element at the other tubular throat of the rigid element and by a complementary detachable element in the form of an open throat securable to the rigid element to complete the tubular throat.

As to the provision of thin sheets of great width from commercially available films and according to another characteristic of the invention, the thin sheets are obtained by edge-to-edge juxtaposition of transverse strips. This mode is adopted in view of the mechanical characteristics and the anisotropy of commercial films obtained by extrusion and drawing and by virtue of the necessity to avoid the influence on the reflector of continuous longitudinal aberrations which have greater influence on the efficiency of the cylindrical material than would localized circular aberrations.

According to the invention, it is preferred that the transverse strips disposed edge-on-edge are connected by means of a strip cemented to their adjacent edges. To maintain the transverse bands and particularly their edges during the assembly operations and having regard to their light weight and electrostatic phenomena, there is preferably utilized a table pierced with orifices in communication with a vacuum source at least in that portion of its surface corresponding to the edges of the strip.

Other characteristics and advantages of the solar collector according to the invention will become apparent from a reading of the description of the embodiment given hereafter by way of example, and not limitatively, with reference to the accompanying drawings, in which:

FIG. 1 is a schematic side elevational view, partly in section, of a solar collector according to the invention;

FIG. 2 is a fragmentary plan view of the collector shown in FIG. 1;

FIG. 3 is a transverse cross-sectional view on the line III—III of FIG. 1;

FIG. 4 is an enlarged fragmentary cross-sectional view, taken on the line IV—IV of FIG. 1;

FIG. 5 is a schematic plan view showing an assembly of strips of plastic material forming a flexible sheet useful during construction of the envelope of the collector according to the invention; and FIG. 6 is an enlarged transverse cross-sectional view showing an embodiment of the assembly of two strips of plastic material so as to form a flexible sheet such as is illustrated in FIG. 5.

In FIGS. 1-3, there is shown an inflatable solar collector comprising a flexible envelope 10, in which is disposed at least one longitudinal tube 20 traversed by a fluid to be heated. In the inflated condition, envelope 10 is cylindrical about a substantially horizontal axis. It is closed by a transparent wall at its end 10a. At its other end, envelope 10 is closed by a lock chamber 30. Chamber 30 encloses a fan 32 that blows air into envelope 10 through a conduit traversing closure 31 so as to inflate the collector. An access door (not shown) is provided in wall 31 to permit the passage of a service truck 34 rolling on horizontal rails 35 interconnected by traverse members 36. When the access door is closed, the interior of the envelope is isolated from the exterior in a substantially airtight manner. Truck 34, when it is not used, is disposed in chamber 30.

Tube 20 is a horizontal metal tube passing through chamber 30, closure 31 and along the entire length of envelope 10. A transparent tube 21, for example of glass, surrounds tube 20 and is spaced from the latter to provide a greenhouse effect. This receiver may be of any other known type.

According to the invention, envelope 10 is comprised by an upper flexible panel 11 and a lower flexible panel 12 disposed on opposite sides of a horizontal plane P and connected along the length of their longitudinal edges by means of rigid stringers 13. The spacing L of the stringers is chosen to have a value between 0.8 and 0.95 times the width of the upper panel when the latter is flat. Thus, the height H of the collector above the plane P is just under L/2. According to the invention the lower part of the collector, below plane P, is protected by two vertical walls 40 fixed at their tops to stringers 13. From this fact it will be seen that the collector offers minimum wind resistance and that the portion comprising the mirror is completely shielded from lateral wind forces.

The resistance of the upper exposed part 11 of the collector to transverse forces may be improved by forming it in at least two flexible portions 111 and 112 into which the panel 11 is divided longitudinally and which are interconnected along their adjacent edges by means of a rigid stringer 15.

Preferably, the width of the lower panel 12 in the flat condition is about 1.3 L, which corresponds to a development of 150° of the circular mirror so that the sun's rays reflected by the reflective coating provide on the inner face of panel 12 will be concentrated on tube 21 both for a low height of the sun above the horizon and also for a substantial elevation of the sun.

Panel 12 thus has a radius of curvature smaller than panel 11, the envelope thus having, in transverse section, an asymmetric biconvex form. At the ends of the envelope, the panels 11 and 12 have their end edges inserted in frames 14 having the same biconvex form as the cross section of the inflated envelope 10.

A particular embodiment of the connection between the longitudinal edges of panels 11 and 12 is shown in detail in FIG. 4.

Each stringer 13 comprises a metal I-beam 131 on the flanges of which are welded, on the same side, two tubes 132, 133 having longitudinal access slots 134, 135 both opening in the direction of the interior of envelope 10. The edges 11a and 12a of panels 11 and 12, which are to be connected, are provided with hems 11b and 12b which are inserted in tubes 132, 133 through slots 134, 135. Rods 136, 137 are threaded into hems 11b, 12b inside tubes 132, 133. The rods 136, 137 having a diameter greater than the width of slots 134, 135 lock the longitudinal edges of the panels 11, 12 in tubes 132, 133. Rods 136, 137 are rigid elements, for example tubes or even hollow elements rigidified by inflation after being emplaced. Rubber strips 138, 139 may be interposed between the edges of each slot and the edge of the panel to avoid damage to the latter.

Of course, other embodiments of the connection between the longitudinal edges of the panels may be provided.

When the upper panel 11 is formed in several parts or longitudinal bands assembled along their adjacent edges by a rigid stringer, the connection between these edges may be provided in the same manner as described for the connection of the edges of the panels 11 and 12.

Thus, the parts of panel 111 and 112 have their adjacent edges 111a and 112a locked in tubes 152 and 153 welded to profile 151, these edges 111a being provided with hems introduced through longitudinal access slots into these tubes and through which are threaded locking rods (FIG. 3). Protective strips (not shown) may be interposed between the edges of the access slots and the edges 111a 112a.

The upper flexible panel 11, if it is in a single piece, or each flexible portion comprising it, if it is in several pieces, is of a transparent synthetic material such as, for example, a polyethylene film treated against aging by ultraviolet rays.

The lower flexible panel 12 is, for example, comprised by a polyester film coated with a reflecting layer, for example aluminized, on its internal surface.

Each panel 12 may, as seen from above, have a width of several meters, which width is several times greater than the commercially available metallized polyester films. Each panel may accordingly be formed by assembling several strips. This assembly is preferably comprised by strips disposed transversely for reasons to be explained hereinafter.

In the case for example of panel 12 (FIG. 5), the assembly can be effected by placing the required number of pieces of strip 121a, 121b ... 131n, edge-to-edge, transversely relative to the panel, then assembling the pieces by means of flexible strips 122a, 122b, ... 122n-1, each applied over the adjacent edges of two neighboring pieces and cemented to these edges. Pressure sensitive adhesive strips can be used, or strips coated with a thermosensitive glue can be pressed on with heating.

When the pieces of strip 121 are relatively long and when the strip is comprised by a thin plastic film, the correct edge-to-edge positioning is facilitated by placing them, at least along their edges which are to be joined, on a surface 41 (FIG. 7) of a table 42, which surface is pierced by holes 43 connected to a vacuum source.

Similarly, the strip 122 to be positioned on these edges is applied against the lower surface 44 of an applicator 45, which surface is pierced by orifices 46 connected to a source of vacuum. Applicator 45 is applied with pressure against table 42 to cement the strip 122 over the edges of the pieces. Then, the connection of the orifices 46 with a source of vacuum is interrupted and the applicator 45 is returned to its starting position above table 42. The orifices 43 are in turn disconnected from the source of vacuum to remove the assembled pieces 121. A flexible strip 47, for example of polyurethane foam, may be interposed between surface 44 of the applicator and the strip 122 so as to permit uniform application of the latter by distribution of the pressure exerted along the entire length of the applicator.

The collector is provided with a known device for following the position of the sun, so that the tube 20 will receive a maximum of radiant energy on the reflective surface of the panel 12.

The tubes 20 and 21 (FIG. 3) are for example suspended by at least two arms 27 from the supports 25, located in the vicinity of the top of the collector. The arms 27 may pivot on supports 25 about an axis substantially coinciding with the axis of the cylindrical surface 12 and such pivoting is controlled by a motor device which in turn is controlled by the sun-following device.

By way of example, the illustrated motor device is comprised by a cable 22 fixed at its ends, on the one hand, to the tube 21, and, on the other hand, on shaft 23 which may be driven in rotation by means of a motor (not shown) controlled by the sun-following device. A spring 24 acts in compression or in tension and is fixed at its ends to the support 25 and the arm 27. Thus, when shaft 23 turns, tube 20 is displaced along a cylindrical surface, so as always to remain in the best position relative to the position of the sun.

Of course, various modifications and additions may be made in the embodiment described above, of an inflatable solar collector, according to the invention, without departing from the spirit of the present invention as defined by the appended claims.

What is claimed is:

1. In a solar collector of the mirror type which is shaped by superatmospheric gaseous pressure on its surface, comprising a rigid frame defining at least two longitudinal edges (13) with at least one sheet (12) secured by its edges on said longitudinal edges of said frame, the surface of said sheet (12) being reflective, a transparent element (11) which is at least partly spaced from said at least one sheet and is impervious to the superatmospheric fluid pressure that shapes said at least one sheet, and means closing the space between the transparent element and said at least one sheet and which enclose with said at least one sheet and transparent element the interior of the collector; the improvement in which the frame is stationary, and a housing (40) which is rigid against the pressure of the wind and which comprises a pair of upright stationary walls that are parallel to said longitudinal edges and that extend from the ground up to the edges of said at least one sheet (12).

2. A collector according to claim 1, characterized in that the transparent element is a flexible sheet (11) shaped by the pressure of the gas, the width of this flexible transparent sheet being less than 125% of the spacing between the side edges (13) on the frame.

3. A solar collector according to claim 1, characterized in that the width of the lower sheet (12) forming the mirror is equal to about 130% of the spacing between the lateral edges (13) of the frame.

4. A solar collector according to claim 1, in which said transparent element (11) is in the form of at least two flexible portions (111 and 112), and a longitudinal reinforcement (15) between and connected to said flexible portions and extending lengthwise of the collector parallel to said longitudinal edges (13).

5. A solar collector according to claim 1, and a longitudinal tube (20) traversed by a fluid to be heated, said tube extending lengthwise of said frame in spaced relation between said sheet and said transparent element, and means mounting said tube for movement relative to the frame thereby to maintain the tube in the focus of the mirror despite the apparent movement of the sun in the sky.

6. A solar collector according to claim 1, characterized in that said transparent element is comprised by plural flexible strips (121a, 121b) joined edgewise along at least one line parallel to said longitudinal edges.

7. A solar collector according to claim 6, characterized in that said strips (121a, 121n) joined edgewise are interconnected by means of strips (122a, 122n1) secured to their adjacent edges.

* * * * *